(12) United States Patent
Peng

(10) Patent No.: US 12,164,108 B2
(45) Date of Patent: Dec. 10, 2024

(54) MASK AND HEAD-MOUNTED DISPLAY DEVICE

(71) Applicant: Huawei Technologies Co., Ltd., Shenzhen (CN)

(72) Inventor: Cheng Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 17/640,732

(22) PCT Filed: Sep. 7, 2020

(86) PCT No.: PCT/CN2020/113781
§ 371 (c)(1),
(2) Date: Mar. 4, 2022

(87) PCT Pub. No.: WO2021/043305
PCT Pub. Date: Mar. 11, 2021

(65) Prior Publication Data
US 2022/0326524 A1 Oct. 13, 2022

(30) Foreign Application Priority Data
Sep. 6, 2019 (CN) .......................... 201910842364.7

(51) Int. Cl.
*G02B 27/01* (2006.01)
(52) U.S. Cl.
CPC ..... *G02B 27/0172* (2013.01); *G02B 27/0176* (2013.01); *G02B 2027/0123* (2013.01)

(58) Field of Classification Search
CPC ............ G02B 27/0172; G02B 27/0176; G02B 2027/0123; G02B 2027/012
See application file for complete search history.

(56) References Cited

U.S. PATENT DOCUMENTS 10,133,305 B1 * 11/2018 Sullivan ............. G02B 27/0176
10,496,130 B1 * 12/2019 Yee ......................... G06F 3/011
11,048,298 B2 * 6/2021 Lin ......................... G06F 1/163
11,526,015 B2 * 12/2022 Ellis ...................... B29C 44/582
(Continued)

FOREIGN PATENT DOCUMENTS

CN 102892391 A 1/2013
CN 104880823 A * 9/2015 ........... G02B 27/017
(Continued)

*Primary Examiner* — Jeff Piziali
(74) *Attorney, Agent, or Firm* — Leydig, Voit & Mayer, Ltd.

(57) ABSTRACT

Embodiments of this application relates to the field of wearable device technologies, and provides a mask and a head-mounted display device. The mask includes a support, an elastic support, and a face fitting spring plate. Lens holes are disposed in the support, the face fitting spring plate is connected to the support by using the elastic support, a middle part of the face fitting spring plate is sunken to the support, an eyepiece hole facing the lens holes is disposed in the face fitting spring plate, and a nose support is disposed in a middle part on a lower side edge of the face fitting spring plate. The head-mounted display device includes the mask and a display device connected to the mask. In the mask, the face fitting spring plate can be deformed under an external force.

16 Claims, 7 Drawing Sheets

(56) References Cited

U.S. PATENT DOCUMENTS

| | | | |
|---|---|---|---|
| 11,686,948 B2* | 6/2023 | Law | G02B 27/0176 |
| | | | 345/8 |
| 2011/0225709 A1* | 9/2011 | Saylor | A61F 9/026 |
| | | | 2/431 |
| 2016/0255748 A1* | 9/2016 | Kim | G02B 27/017 |
| | | | 361/695 |
| 2017/0090514 A1* | 3/2017 | Byun | G02B 27/0176 |
| 2017/0259167 A1* | 9/2017 | Cook | A63F 13/212 |
| 2017/0337737 A1* | 11/2017 | Edwards | F16M 13/04 |
| 2018/0095498 A1* | 4/2018 | Raffle | G06K 7/10297 |
| 2019/0137765 A1* | 5/2019 | Chang | G02B 27/0176 |
| 2020/0050236 A1* | 2/2020 | Lin | G06F 3/011 |
| 2020/0278556 A1* | 9/2020 | Chae | G06F 3/011 |
| 2021/0318545 A1* | 10/2021 | Yamamoto | G02B 27/0176 |

FOREIGN PATENT DOCUMENTS

| | | |
|---|---|---|
| CN | 205003374 U | 1/2016 |
| CN | 105388615 A | 3/2016 |
| CN | 205826970 U | 12/2016 |
| CN | 206020812 U | 3/2017 |
| CN | 207181831 U | 4/2018 |
| CN | 108761796 A | 11/2018 |
| CN | 109387944 A | 2/2019 |
| CN | 109752849 A | 5/2019 |
| CN | 110716308 A | 1/2020 |
| CN | 210776036 U | 6/2020 |
| KR | 200478490 Y1 | 10/2015 |
| KR | 20180095160 A | 8/2018 |

* cited by examiner

MASK AND HEAD-MOUNTED DISPLAY DEVICE

This application is a National Stage of International Application No. PCT/CN2020/113781, filed Sep. 7, 2020, which claims priority to Chinese Patent Application No. 201910842364.7, filed Sep. 6, 2019, both of which are hereby incorporated by reference in their entireties.

TECHNICAL FIELD

This application relates to the field of wearable device technologies, and in particular, to a mask and a head-mounted display device.

BACKGROUND

With development of near-eye display technologies, head-mounted display devices are widely applied in scenarios such as work, life, and entertainment. The head-mounted display device generally includes a display apparatus and a mask. When a user wears the head-mounted display device, the mask fits the face to form closed space, to enhance a sense of immersion for the user. In related technologies, generally, a plurality of foam layers are used to increase a thickness of a face fitting part fitting the face, so that the mask can match faces with different face shapes. However, the relatively thick face fitting part causes relatively poor air permeability of the mask, which affects wearing comfortableness of the mask.

SUMMARY

Embodiments of this application provide a mask and a head-mounted display device, to reduce a thickness of a face fitting part of a mask and improve air permeability of the mask, thereby improving wearing comfortableness of the mask.

According to a first aspect, an embodiment of this application provides a mask. The mask includes a support, an elastic support, and a face fitting spring plate. Lens holes are disposed in the support. The face fitting spring plate is connected to the support by using the elastic support. A middle part of the face fitting spring plate is sunken to the support. An eyepiece hole facing the lens holes is disposed in the face fitting spring plate. A nose support is disposed in a middle part on a lower side edge of the face fitting spring plate.

In the mask provided in this embodiment of this application, both the face fitting spring plate and the elastic support can be deformed when being in a stressed state. Therefore, when different users wear the mask, the face fitting spring plate can be deformed adaptively according to different face shapes, so that the face fitting spring plate can fit faces of different users. In related technologies, a plurality of foam layers need to be used to be adapted to different face shapes. In comparison with the related technologies, the face fitting spring plate fits different face shapes through deformation, thereby greatly reducing a foam use amount of a face fitting part of the mask. In this way, a thickness of the face fitting part of the mask is reduced, and air permeability of the mask is improved, thereby further improving wearing comfortableness of the mask. In addition, because the foam use amount is greatly reduced, a volume of the mask may also be significantly reduced, thereby improving convenience in carrying the mask.

In a possible implementation, the face fitting spring plate is a ring-shaped spring plate, and a hole enclosed by the ring-shaped spring plate is the eyepiece hole. By using this design, the face fitting spring plate has a large deformation range, so that the face fitting spring plate can match a larger range of face shapes, thereby improving applicability of the mask.

In a possible implementation, a middle depression on the lower side edge of the ring-shaped spring plate forms the nose support, and a part that is of the ring-shaped spring plate and that forms the nose support is twisted by a specified angle relative to the remaining part of the ring-shaped spring plate. By using this design, when the user wears the mask, the nose support fits the nose of the user, to support the mask by using the nose of the user, thereby preventing the mask from slipping from the face of the user.

In a possible implementation, the eyepiece hole includes a left eyepiece hole part and a right eyepiece hole part that are located on two sides of the nose support, and the left eyepiece hole part and the right eyepiece hole part are connected to each other on sides opposite to each other.

In a possible implementation, a left-eye lens hole and a right-eye lens hole are disposed in a frame board, and the left-eye lens hole and the right-eye lens hole form the lens holes. By using this design, no obstacle exists in regions corresponding to the left eye and the right eye of the user, thereby improving image integrity in the eyes of the user.

In a possible implementation, an arc-shaped notch is disposed in a middle part on a lower side edge of the frame board, and the arc-shaped notch is opposite to the nose support.

In a possible implementation, the support includes a lens frame, a nose support is disposed in a middle part of a lower side edge of the lens frame, a left-eye lens hole and a right-eye lens hole on two sides of the nose support are disposed in the lens frame, and the left-eye lens hole and the right-eye lens hole form the lens holes. By using this design, when the user wears the mask, the nose support fits the nose of the user, to support the mask by using the nose of the user, thereby preventing the mask from slipping from the face of the user.

In a possible implementation, at least one lightening hole is disposed in a region located between the left-eye lens hole and the right-eye lens hole of the support. By using this design, a weight of the support can be reduced, and face fatigue can be avoided when the user wears the mask for a long time.

In a possible implementation, the support includes a sheet-like bezel, and holes enclosed by the sheet-like bezel are the lens holes.

In a possible implementation, an arc-shaped depression part is disposed in a middle part on a lower side edge of the sheet-like bezel, and the arc-shaped depression part is sunken to an upper side edge of the sheet-like bezel.

In a possible implementation, the elastic support is a long-strip-shaped elastic strip. The long-strip-shaped elastic strip is used to connect the support and the face fitting spring plate, so that the face fitting spring plate has a larger deformation range, thereby improving applicability of the mask.

In a possible implementation, left and right sides of the face fitting spring plate are respectively connected to left and right sides of the support by using the long-strip-shaped elastic strips. By using this design, the face fitting spring plate can be symmetrically supported on the left and right sides, thereby improving a fitting effect between the face fitting spring plate and the face of the user.

In a possible implementation, the middle part of the face fitting spring plate is connected to a middle part of the support by using the long-strip-shaped elastic strip.

In a possible implementation, the elastic support is a U-shaped elastic strip or a V-shaped elastic strip, and left and right sides of the face fitting spring plate are respectively connected to left and right sides of the support by using the U-shaped elastic strips or the V-shaped elastic strips. By using this design, when the user wears the mask, stability of the face fitting spring plate can be improved.

In a possible implementation, the elastic support is an elastic plate that is the same as the face fitting spring plate, a middle part of the elastic support is connected to a middle part of the support, and left and right sides of the elastic support are connected to left and right sides of the face fitting spring plate.

In a possible implementation, the mask further includes a light-shielding cloth, and the light-shielding cloth covers space between the face fitting spring plate and the support. By using this design, when the user wears the mask, the light-shielding cloth can be used to prevent external light from entering the mask.

According to a second aspect, an embodiment of this application provides a head-mounted display device including the mask in the first aspect and a display device disposed in front of the mask.

Because the head-mounted display device provided in this embodiment of this application includes the mask in the first aspect, the head-mounted display device also has advantages of the mask. Details are not described herein again.

DESCRIPTION OF EMBODIMENTS

A mask provided in the embodiments of this application is applicable to a head-mounted display device such as a virtual reality head-mounted display device (Virtual Reality, VR head-mounted display), an augmented reality head-mounted display device (Augmented Reality, AR head-mounted display), or a mixed reality head-mounted display device (Mixed Reality, MR head-mounted display for short). The following uses a mask in the virtual reality head-mounted display device as an example for description.

Figure 1:
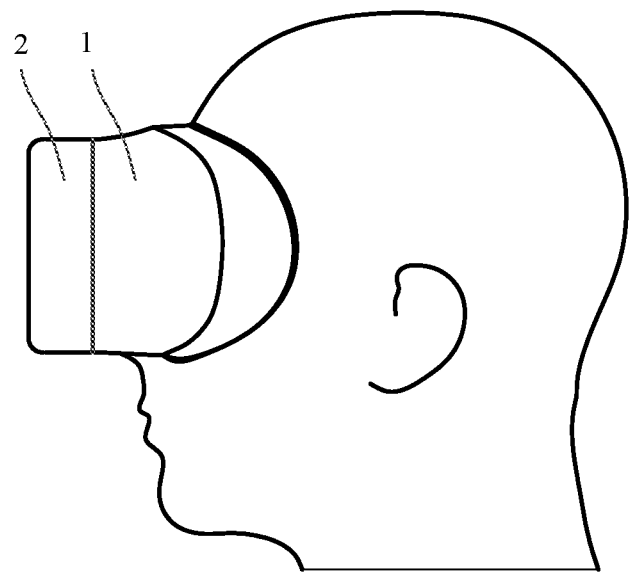
FIG. 1 is a schematic structural diagram of a head-mounted display device according to an embodiment of this application.

As shown in FIG. 1, generally, a virtual reality head-mounted display device includes a mask 1 and a display apparatus 2 installed in front of the mask 1. The display apparatus 2 may be an apparatus for displaying information such as a text, an image, or an animation, for example, a mobile phone, a game console, or a tablet computer. The display apparatus 2 is disposed in front of the mask 1, and the mask fits the face of a user at rear of the mask, to prevent external light from entering between the eyes of the user and the display apparatus 2, thereby enhancing a sense of immersion of the user.

In the mask provided in this embodiment of this application, a face fitting spring plate is used in a part of the mask fitting the face of the user. The face fitting spring plate can be deformed to some extent when being under an external force. In this way, when different users wear the mask, the face fitting spring plate can be deformed adaptively according to different face shapes of users, so that the face fitting spring plate can fit faces of different users. In related technologies, a plurality of foam layers need to be used to be adapted to different face shapes. In comparison with the related technologies, the face fitting spring plate can be used to ensure fitting the faces of different users, thereby greatly reducing a foam use amount. In this way, air permeability of the mask is improved, thereby further improving wearing comfortableness of the mask. The following describes the implementations of the embodiments of this application in detail with reference to the accompanying drawings.

Embodiment 1

Figure 2:
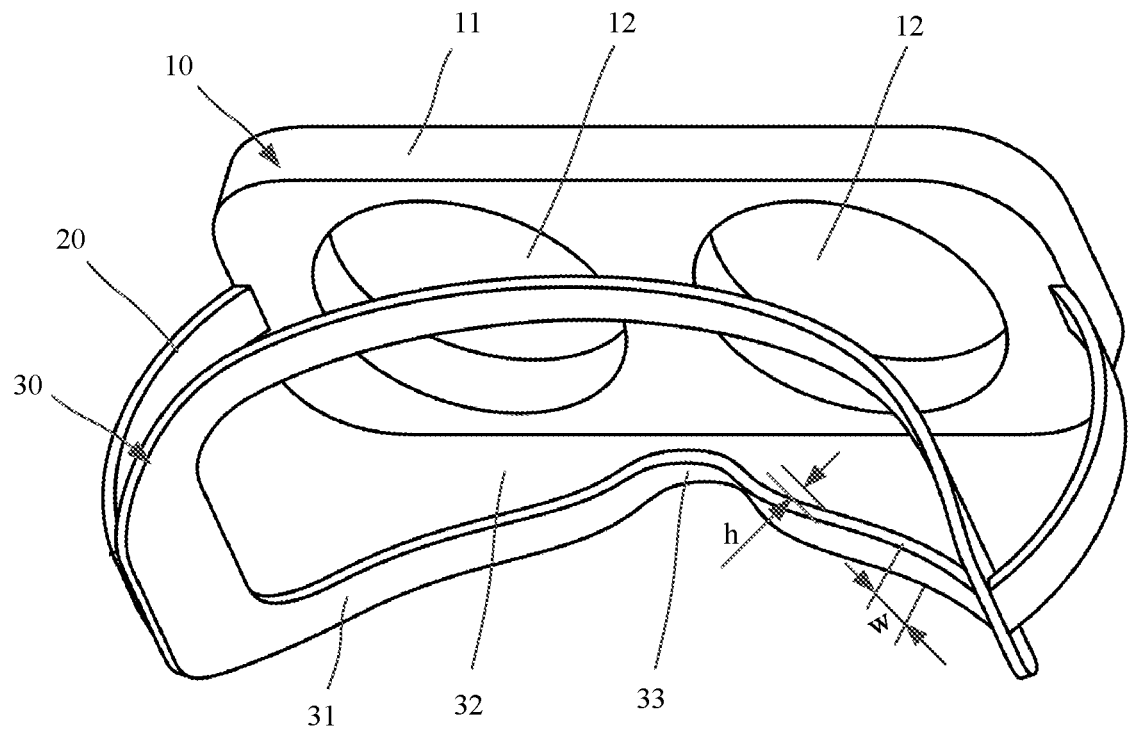
FIG. 2 is a schematic structural diagram of a mask before being worn according to Embodiment 1 of this application.

As shown in FIG. 2, a mask provided in Embodiment 1 of this application includes a support 10, an elastic support 20, and a face fitting spring plate 30. The support 10 includes a frame board 11 and two lens holes 12 disposed in the frame board 11. The frame board 11 is a rectangular board. Four corners of the rectangular board are rounded corners, to improve beauty of the frame board 11. In addition, by using a design of the rounded corners of the frame board 10, the user can be protected from a scratch, thereby improving use safety of the mask.

The two lens holes 12 are disposed inside the frame board, and the two lens holes 12 are symmetrically disposed in the frame board 11. When the user wears the mask, the two lens holes 12 are respectively opposite to the eyes of the user. The lens hole 12 opposite to the left eye of the user may be referred to as a left-eye lens hole, and the lens hole 12 opposite to the right eye of the user may be referred to as a right-eye lens hole. The lens holes 12 are used to accommodate lenses. The lens may be a convex lens, or a combination of convex lenses and concave lenses. The lens hole 12 includes but is not limited to a circular hole, an elliptical hole, a triangular hole, a square hole, or a polygonal hole. In this embodiment, the lens hole is a circular hole, and the lens correspondingly mounted in the lens hole 12 is a circular lens.

The elastic support 20 is a long-strip-shaped elastic strip, and is used to connect the support 10 and the face fitting spring plate 30 together. In addition, when the user wears the mask, the elastic support 20 is also deformed to some extent, so that the face fitting spring plate 30 better fits the face of the user. A quantity of elastic supports 20 may be one, two, or more. When different quantities of elastic supports 20 are used to connect the support 10 and the face fitting spring plate 30, there are also a plurality of options of connection locations for the elastic supports 20 separately connecting the support 10 to the face fitting spring plate 30.

For example, when one elastic support 20 is used, two ends of the elastic support 20 are generally connected to a middle part of the frame board 11 and a middle part of the face fitting spring plate 30. To be specific, one end of the elastic support 20 is connected to the middle part of the frame board 11, and the other end of the elastic support 20 is connected to the middle part of the face fitting spring plate 30. For another example, when two elastic supports 20 are used, the two elastic supports 20 may be connected to both left and right sides of the frame board. One end of one elastic support 20 is connected to the left side of the frame board 11, and the other end of the elastic support 20 is connected to a left side of the face fitting spring plate 30. One end of the other elastic support 20 is connected to the right side of the frame board 11, and the other end of the other elastic support 20 is connected to a right side of the face fitting spring plate 30. Alternatively, both the two elastic supports 20 are disposed in the middle part of the frame board 11. One end of one elastic support 20 is connected to an upper side edge of the frame board 11, and one end of the other elastic support 20 is connected to a lower side edge of the frame board 11. Correspondingly, the other end of the elastic support 20 in the two elastic supports 20 is connected to an upper side edge of the face fitting spring plate 30, and the other end of the other elastic support 20 is connected to a lower side edge of the face fitting spring plate 30.

For still another example, when three elastic supports 20 are used, in a direction from left to right of the frame board 11, the three elastic supports 20 are respectively connected to a left side, a middle part, and a right side of the frame board 11. In other words, in the direction from left to right of the frame board 11, the left side, the middle part, and the right side of the frame board 11 each are connected to one end of one elastic support 20, and the other ends of the three elastic supports 20 each are connected to a left side, a middle part, and a right side of the face fitting spring plate 30. It may be understood that, on the two sides of the frame board 11, two or more elastic supports 20 may be used to connect the face fitting spring plate 30 on one side such as the left side, and elastic supports 20 with a quantity that is the same as or different from the left side may be used to connect the face fitting spring plate 30 on the other side such as the right side. In addition, when two or more elastic supports 20 are disposed on each of the left side and/or the right side of the frame board 11, the elastic supports 20 on the same side may be disposed in parallel, or may be disposed in a crossing manner.

Figure 3:
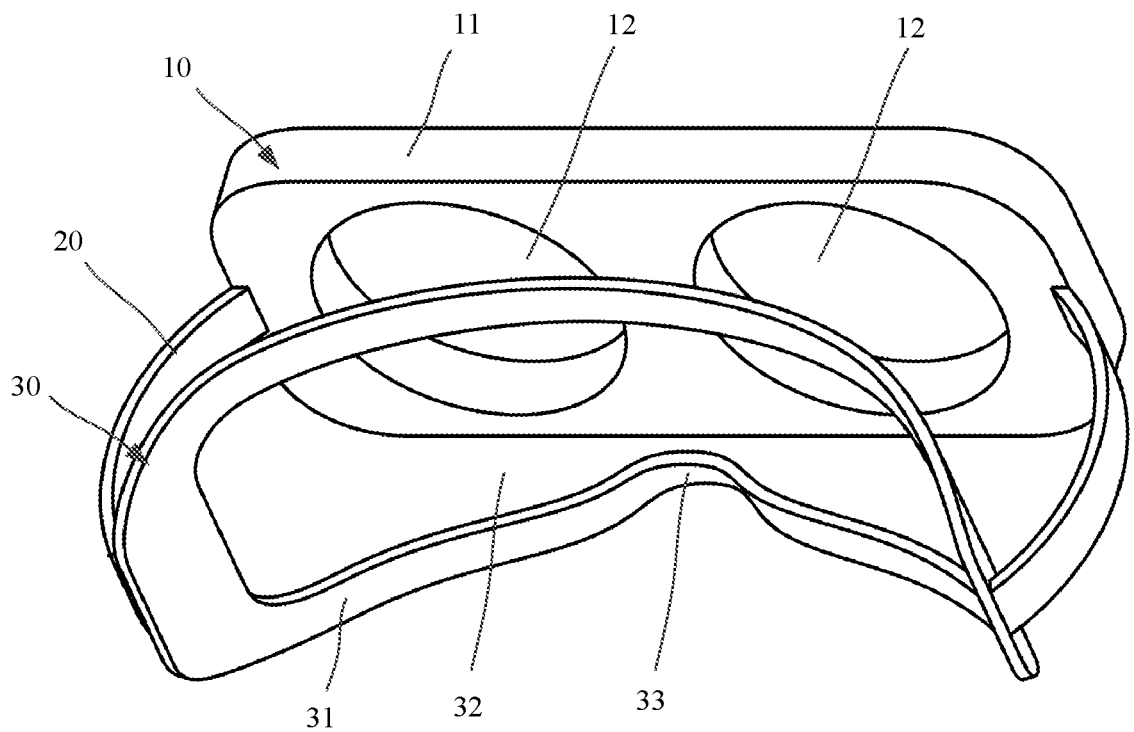
FIG. 3 is a schematic structural diagram of a mask after being worn according to Embodiment 1 of this application.
Figure 4:
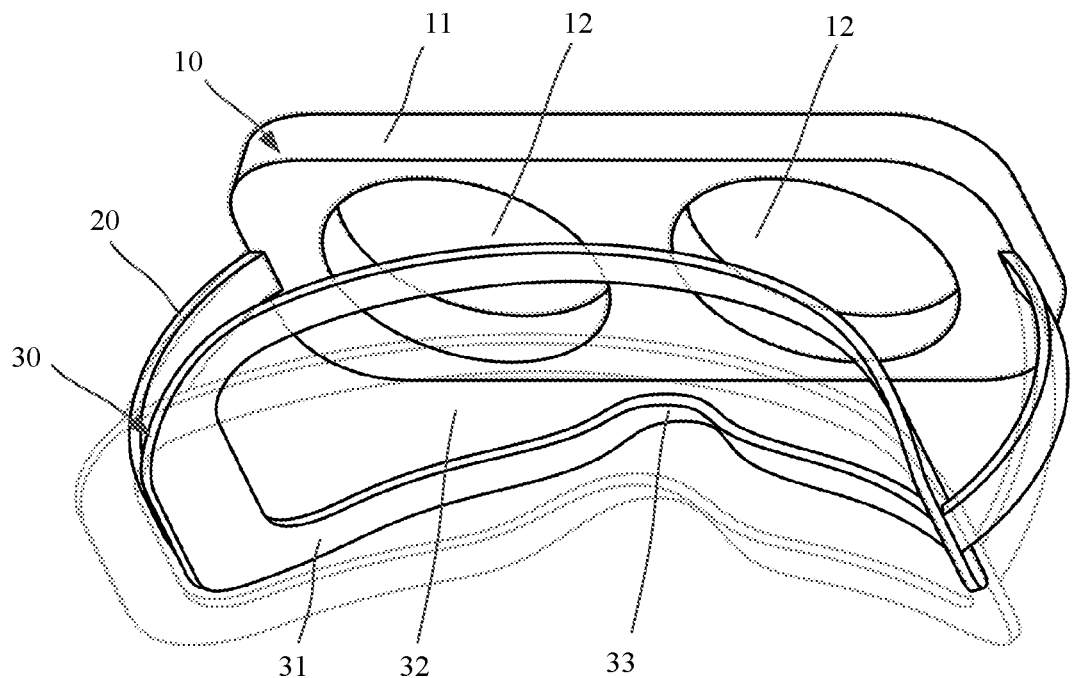
FIG. 4 is a comparison diagram of a mask before being worn and the mask after being worn according to Embodiment 1 of this application.

The middle part of the face fitting spring plate 30 is sunken to the support 10. In the direction from left to right of the frame board 11, the face fitting spring plate 30 is approximately in an arc shape. A contour shape of the face fitting spring plate 30 is similar to a contour of the face of the user. More specifically, the contour shape of the face fitting spring plate 30 is similar to the contour of the face above the nose of the user. When the user wears the mask, the face fitting spring plate 30 can fit the face of the user. The face fitting spring plate 30 is made of an elastic material, so that the face fitting spring plate can be deformed under an external force. In this way, the face fitting spring plate 30 can fit different face shapes, thereby improving applicability of the mask. As shown in FIG. 2, FIG. 3, and FIG. 4, the face fitting spring plate 30 in FIG. 2 is not under an external force. In this case, the face fitting spring plate 30 is in an arc shape. The face fitting spring plate 30 in FIG. 3 is under an external force. In this case, the face fitting spring plate 30 in FIG. 3 is deformed to some extent relative to the face fitting spring plate 30 in FIG. 2. FIG. 4 is a comparison diagram of the face fitting spring plate 30 before being under an external force and the face fitting spring plate 30 after being under an external force. Black solid lines show shapes of the elastic support 20 and the face fitting spring plate 30 after being under an external force, and lines in a lighter color show shapes of the elastic support 20 and the face fitting spring plate 30 before being under the external force.

In this embodiment, the face fitting spring plate 30 includes a ring-shaped spring plate 31. The ring-shaped spring plate 31 is a sheet-like elastic plate with an opening inside. The opening inside the ring-shaped spring plate 31 is an eyepiece hole 32. The eyepiece hole 32 may be a long-strip-shaped rectangular hole. Content displayed by using the display apparatus enters the eyes of the user through the lens holes 12 and the eyepiece hole 32. The ring-shaped spring plate 31 includes a left side edge and a right side edge that are disposed opposite to each other, and an upper side edge and a lower side edge that are disposed opposite to each other. The upper side edge and the lower side edge are located between the left side edge and the right side edge, and are separately connected to the left side edge and the right side edge. The left side edge, the right side edge, the upper side edge, and the lower side edge may be an integrated structure. The eyepiece hole 12 is enclosed by using the left side edge, the right side edge, the upper side edge, and the lower side edge.

A surface that is of the ring-shaped spring plate 31 and that is away from the support 10 is a face fitting surface. The face fitting surface is a surface fitting the face of the user. A width w of each side edge of the ring-shaped spring plate 31 is greater than a thickness h of the ring-shaped spring plate. In this way, when the face fitting surface of the ring-shaped spring plate 31 fits the face of the user, a contact area between the ring-shaped spring plate 31 and the face of the user is relatively large. Therefore, when the user wears the mask for a long time, the ring-shaped spring plate 31 is forced into the face of the user, causing a significant indentation or a ligature mark on the face of the user.

The left side edge and the right side edge of the ring-shaped spring plate 31 are respectively connected to the left and right sides of the frame board 11 by using the elastic support 20. Both the upper side edge and the lower side edge of the ring-shaped spring plate 31 are in an arc shape. A middle part of the lower side edge of the ring-shaped spring plate 31 is sunken to the support 10 to form a nose support 33. A part that is of the spring plate and that forms the nose support 33 is twisted by a specified angle relative to the spring plate in the remaining region of the lower side edge, or the spring plate in the nose support is inclined by a specific angle relative to the remaining region of the lower side edge. The angle is greater than 0 degrees and less than 90 degrees. When the user wears the mask, the part that is of the ring-shaped spring plate 31 and that is located in the nose support 33 fits the nose of the user, and the ring-shaped spring plate 31 in the remaining region other than the nose support 33 fits the face of the user. By using this design, a fitting effect between the face fitting spring plate 30 and the face of the user can be improved, and the nose support 33 fits the nose of the user to support the mask, thereby preventing the mask from slipping from the face of the user and improving comfortableness of the mask.

In the mask provided in Embodiment 1 of this application, both the face fitting spring plate 30 and the elastic support 20 can be deformed under an external force. Therefore, when different users wear the mask, the face fitting spring plate 30 and the elastic support 20 are deformed in different degrees. In other words, the face fitting spring plate 30 and the elastic support 20 are deformed adaptively according to face shapes of different users, so that the face fitting spring plate 30 fits the faces of users. In related technologies, a plurality of foam layers are used to be adapted to different face shapes. In comparison with the related technologies, the mask is applicable to different face shapes without using the plurality of foam layers. In this way, a thickness of a face fitting part of the mask is significantly reduced, and air permeability of the mask is improved, thereby further improving wearing comfortableness of the mask. In addition, because a foam use amount is greatly reduced, a volume of the mask is also significantly reduced, thereby improving convenience in carrying the mask.

In the foregoing mask, materials of the support 10, the elastic support 20, and the face fitting spring plate 30 may be plastic, metal, or alloy. In addition, the support 10, the elastic support 20, and the face fitting spring plate 30 may be an integrated molding structure. For example, the support 10, the elastic support 20, and the face fitting spring plate 30 are an integrated injection molding structure. However, this is not limited thereto. The support 10, the elastic support 20, and the face fitting spring plate 30 may alternatively be independent parts to form the foregoing structure of the mask in a connection manner such as screwing, welding, or bonding. For example, the support 10, the elastic support 20, and the face fitting spring plate 30 are respectively titanium alloy parts, and are connected together in a welding manner.

To facilitate wearing performed by the user, in a possible implementation, the foregoing mask generally further includes a headband. Both ends of the headband may be connected to the left and right sides of the frame board 11, or may be connected to the left and right sides of the face fitting spring plate 30. When the user wears the mask, the mask may be fastened to the face of the user through adjusting the headband. In addition, the headband generates a pulling force, and exerts the pulling force to the face fitting spring plate 30 and the elastic support 20, so that the face fitting spring plate 30 is deformed. In this way, a shape of the face fitting spring plate 30 matches the face of the user, so that the face fitting spring plate 30 fits the face of the user.

The mask provided in Embodiment 1 of this application generally further includes a light shielding cloth. The light shielding cloth generally covers a side surface of the support 10 and a side surface of the face fitting spring plate 30. The light shielding cloth is used to cover space between the support 10 and the face fitting spring plate 30, to prevent external light from entering the mask after the user wears the mask. It may be understood that the elastic support strip 20 is covered by the light shielding cloth. A light shielding effect may be improved. In addition, the elastic support strip 20 may be hidden under the light shielding cloth. In this way, a design of an outer surface of the mask is simple and elegant, thereby improving beauty of the mask.

In a possible implementation, the mask generally further includes a foam. The foam is a single foam layer. The foam is generally disposed on the face fitting surface that is of the face fitting spring plate 30 and that fits the face of the user, to improve wearing comfortableness of the mask. A shape and a size of the foam are the same as or similar to those of the face fitting spring plate 30. A through hole corresponding to the eyepiece hole 32 is disposed in a middle part of the foam. In this way, the foam does not block light from entering the eyes of the user, thereby ensuring a viewing angle range of the mask. In addition, the foam is usually wrapped in the light shielding cloth. The light shielding cloth can be used to protect the foam from damage and prolong service life of the foam.

Embodiment 2

Figure 5:
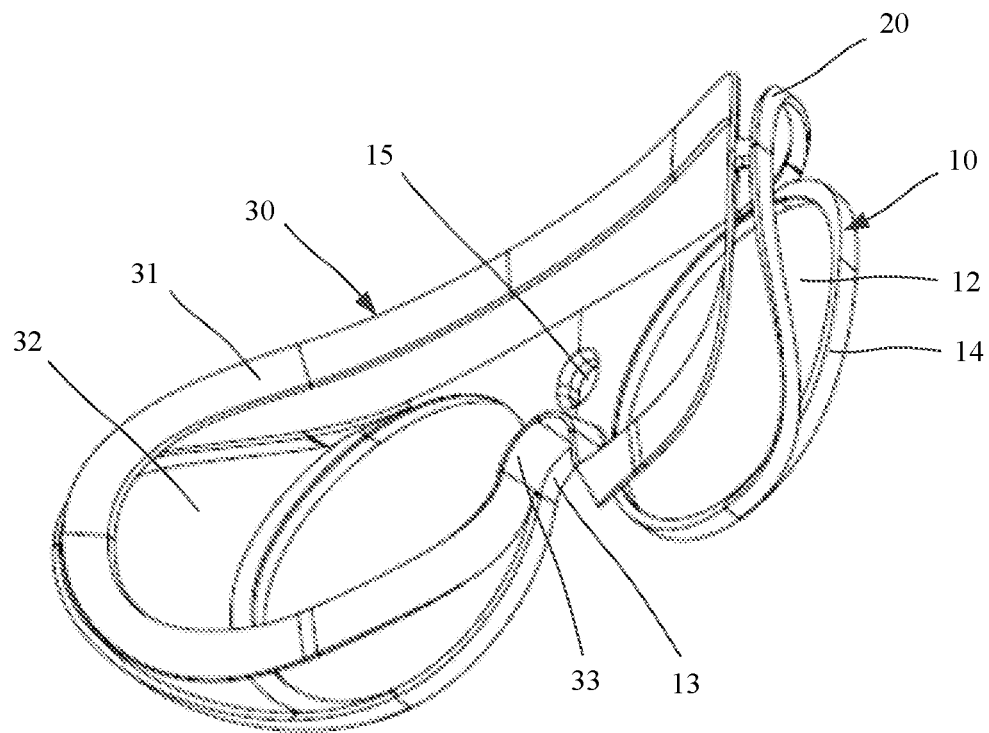
FIG. 5 is a stereoscopic rear view of a mask according to Embodiment 2 of this application.
Figure 6:
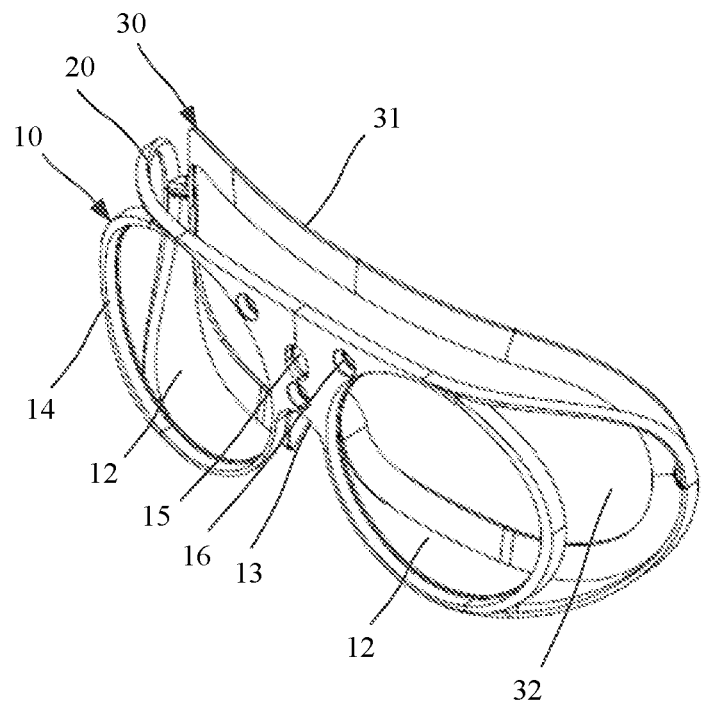
FIG. 6 is a stereoscopic front view of a mask according to Embodiment 2 of this application.

As shown in FIG. 5 and FIG. 6, a mask provided in Embodiment 2 of this application includes a support 10, an elastic support 20, and a face fitting spring plate 30. The support 10 includes a lens frame 14 and two lens holes 12 disposed in the lens frame 14. The lens frame 14 is similar to a glasses frame. The lens frame 14 includes two lens rims and a bridge part connecting the two lens rims. Each lens rim is disposed with one lens hole 12. The two lens holes 12 are symmetrically disposed in the lens frame 14. The lens hole 12 is used to accommodate a lens. The lens hole 12 includes but is not limited to a circular hole, an elliptical hole, a triangular hole, a square hole, or a polygonal hole. In this embodiment, the lens hole is a circular hole, and the lens correspondingly mounted in the lens hole 12 is a circular lens.

Figure 7:
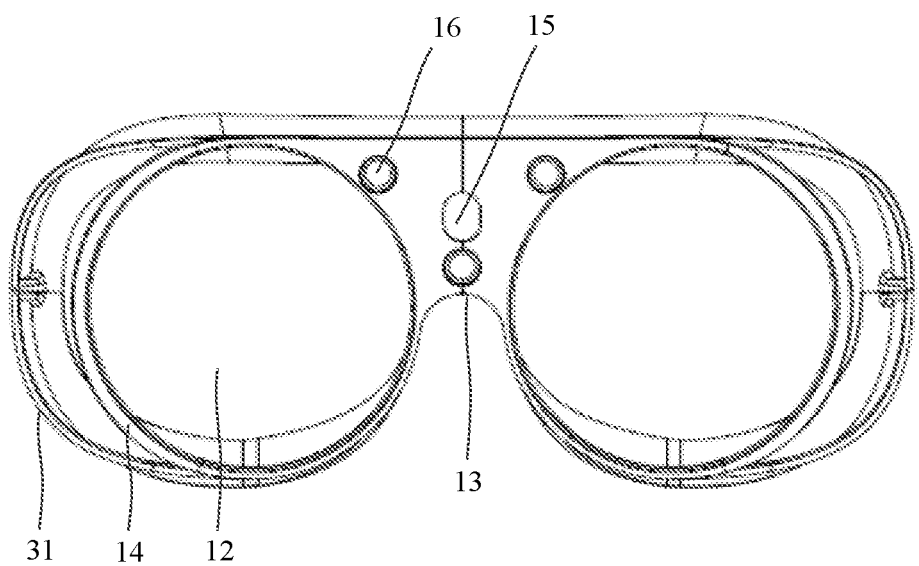
FIG. 7 is a main view of FIG. 6.
Figure 8:
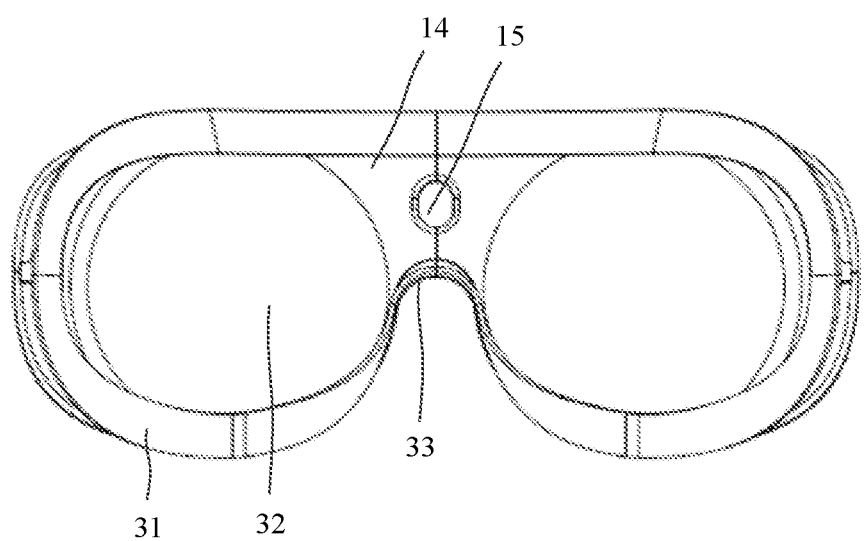
FIG. 8 is a rear view of FIG. 6.

The bridge part and the two lens rims may be an integrated molding structure. As shown in FIG. 7 and FIG. 8, at least one lightening hole 16 and at least one mounting hole 15 are disposed in the bridge part. In other words, the lightening hole 16 and the mounting hole 15 are disposed in a region of the lens frame 11 between the two lens holes 12. In this design, a weight of the support 10 may be reduced to further reduce a weight of the mask, and face fatigue can be avoided when a user wears the mask for a long time. In addition, an indicator or another function key may be disposed in the lightening hole 16 and the mounting hole 15. In related technologies, the function key is disposed outside the mask. In comparison with the related technologies, the function key is disposed inside the mask, so that a shape of the mask is simple and elegant, thereby improving beauty of the mask.

An arc-shaped notch 13 is disposed between the two lens holes 12. Two side surfaces of the arc-shaped notch 13 each are a part of an outer surface of each of the two lens rims. A bottom surface of the arc-shaped notch 13 is a part of an outer surface of the bridge part. The arc-shaped notch 13 corresponds to a nose support part of the face fitting spring plate 30. In this design, a circumferential contour of a region of the support 10 of the mask is the same as or similar to that of a region of the face fitting spring plate 30, thereby improving overall beauty of the mask.

Figure 9:
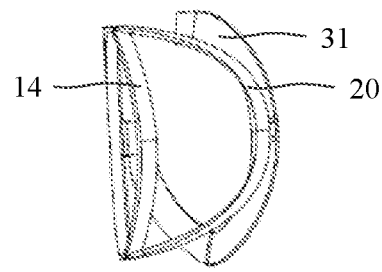
FIG. 9 is a left view of FIG. 6.
Figure 10:
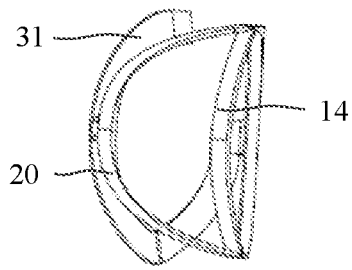
FIG. 10 is a right view of FIG. 6.

The elastic support 20 may be a U-shaped elastic strip or a V-shaped elastic strip, and is used to connect the support 10 and the face fitting spring plate 30 together. In addition, when the user wears the mask, the elastic support 20 is also deformed to some extent, so that the face fitting spring plate better fits the face of the user. In this embodiment, the elastic support 20 uses a U-shaped elastic strip, and there are two U-shaped elastic strips. The two U-shaped elastic strips are separately connected to left and right sides of the support 10 and left and right sides of the face fitting spring plate 30. More specifically, as shown in FIG. 9 and FIG. 10, two ends of the U-shaped elastic strip are respectively connected to middle parts of upper and lower side edges of the lens hole 12, and a bottom of the U-shaped elastic strip is connected to the face fitting spring plate 30.

In comparison with Embodiment 1 in which the elastic support 20 is a long-strip-shaped elastic strip, in Embodiment 2, the elastic support 20 is a U-shaped elastic strip or a V-shaped elastic strip having relatively large strength, thereby improving connection strength between the face fitting spring plate 30 and the support 10. In addition, when the user wears the mask in Embodiment 2, two side edges of the U-shaped elastic strip or the V-shaped elastic strip are used to support the face fitting spring plate 30, so that the face fitting spring plate 30 has better stability.

A middle part of the face fitting spring plate 30 is sunken to the support 10. In a direction from left to right of the lens frame 14, the face fitting spring plate 30 is approximately in an arc shape. A contour shape of the face fitting spring plate 30 is similar to a contour of the face of the user. More specifically, the contour shape of the face fitting spring plate 30 is similar to the contour of the face above the nose of the user. When the user wears the mask, the face fitting spring plate 30 can fit the face of the user. The face fitting spring plate 30 is made of an elastic material, so that the face fitting spring plate 30 can be deformed under an external force. In this way, the face fitting spring plate 30 can fit different face shapes, thereby improving applicability of the mask.

In this embodiment, the face fitting spring plate 30 includes a ring-shaped spring plate 31. The ring-shaped spring plate 31 is a sheet-like elastic plate with an opening inside. The opening inside the ring-shaped spring plate 31 is an eyepiece hole 32. Content displayed by using a display apparatus enters the eyes of the user through the lens holes 12 and the eyepiece hole 32. A shape of the ring-shaped spring plate 31 is similar to a shape of a racetrack. The ring-shaped spring plate 31 includes a left side edge and a right side edge that are disposed opposite to each other, and an upper side edge and a lower side edge that are disposed opposite to each other. The upper side edge and the lower side edge are two long side edges of the ring-shaped spring plate 31, and the left side edge and the right side edge are two short side edges of the ring-shaped spring plate 31. The upper side edge and the lower side edge are located between the left side edge and the right side edge, and are separately connected to the left side edge and the right side edge. The left side edge, the right side edge, the upper side edge, and the lower side edge are an integrated structure. The eyepiece hole 12 is enclosed by using the left side edge, the right side edge, the upper side edge, and the lower side edge. The eyepiece hole 12 includes a left eyepiece hole part and a right eyepiece hole part that are connected to each other. The left eyepiece hole part and the right eyepiece hole part are located on two sides of a nose support 33. The left eyepiece hole part and the right eyepiece hole part are connected to each other on sides opposite to each other. The left eyepiece hole part corresponds to the lens hole 12 corresponding to the left eye of the user in the lens frame 14, and the right eyepiece hole part corresponds to the lens hole 12 corresponding to the right eye of the user in the lens frame 14. Areas of the left eyepiece hole part and the right eyepiece hole part are generally greater than areas of the corresponding lens holes 12, to enlarge a field of view of the eyepiece hole 32. In this way, an edge of the eyepiece hole 32 does not block light emitted by the display device from entering human eyes.

A surface that is of the ring-shaped spring plate 31 and that is away from the support 10 is a face fitting surface. The face fitting surface is a surface fitting the face of the user. A width of each side edge of the ring-shaped spring plate 31 is greater than a thickness of the ring-shaped spring plate. In this way, when the face fitting surface of the ring-shaped spring plate 31 fits the face of the user, a contact area between the ring-shaped spring plate 31 and the face of the user is relatively large. Therefore, when the user wears the mask for a long time, the ring-shaped spring plate 31 is forced into the face of the user, causing a significant indentation or a ligature mark on the face of the user.

Figure 11:
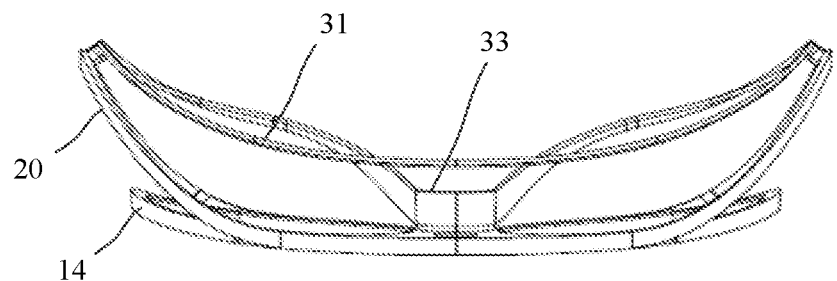
FIG. 11 is a top view of FIG. 6.
Figure 12:
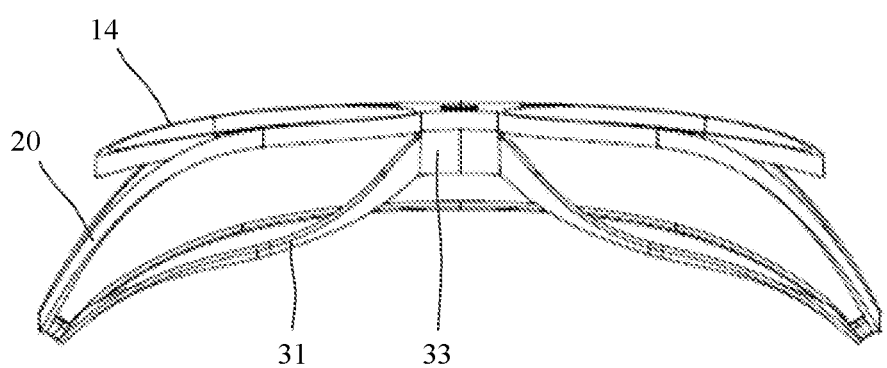
FIG. 12 is a bottom view of FIG. 6.

The left side edge and the right side edge of the ring-shaped spring plate 31 are respectively connected to left and right sides of the lens frame 14 by using the elastic support 20. Both the upper side edge and the lower side edge of the ring-shaped spring plate 31 are in an arc shape. A middle part of the lower side edge of the ring-shaped spring plate 31 is sunken to the support 10 to form the nose support 33. As shown in FIG. 11 and FIG. 12, a part that is of the spring plate and that forms the nose support 33 is twisted by a specified angle relative to the remaining region of the lower side edge, or the spring plate in the nose support 33 is inclined by a specific angle relative to the spring plate in the remaining region of the lower side edge. The angle is greater than 0 degrees and less than 90 degrees. When the user wears the mask, the part that is of the ring-shaped spring plate 31 and that is located in the nose support 33 fits the nose of the user, and the ring-shaped spring plate 31 in the remaining region other than the nose support 33 fits the face of the user. By using this design, a fitting effect between the face fitting spring plate 30 and the face of the user can be improved, and the nose support 33 fits the nose of the user to support the mask, thereby preventing the mask from slipping from the face of the user and improving comfortableness of the mask.

In the mask provided in Embodiment 2 of this application, both the face fitting spring plate 30 and the elastic support 20 can be deformed under an external force. Therefore, when different users wear the mask, the face fitting spring plate 30 and the elastic support 20 are deformed in different degrees, so that the face fitting spring plate 30 can fit faces of different users. In related technologies, a plurality of foam layers are used to be adapted to different face shapes. In comparison with the related technologies, the mask is applicable to different face shapes without using the plurality of foam layers. In this way, a thickness of the face fitting part of the mask is significantly reduced, and air permeability of the mask is improved, thereby further improving wearing comfortableness of the mask. In addition, because the foam use amount is greatly reduced, a volume of the mask may also be significantly reduced, thereby improving convenience in carrying the mask.

In the foregoing mask, materials of the support 10, the elastic support 20, and the face fitting spring plate 30 may be plastic, metal, or alloy. In addition, the support 10, the elastic support 20, and the face fitting spring plate 30 may be an integrated molding structure. For example, the support 10, the elastic support, and the face fitting spring plate 30 are an integrated injection molding structure. However, this is not limited thereto. The support 10, the elastic support 20, and the face fitting spring plate 30 may alternatively be independent parts to form the foregoing structure of the mask in a connection manner such as screwing, welding, or bonding. For example, the support 10, the elastic support 20, and the face fitting spring plate 30 are respectively titanium alloy parts, and are connected together in a welding manner.

To facilitate wearing performed by the user, in a possible implementation, the foregoing mask generally further includes a headband. Both ends of the headband may be connected to the left and right sides of the lens frame 14, or may be connected to the left and right sides of the face fitting spring plate 30. When the user wears the mask, the mask may be fastened to the face of the user through adjusting the headband. In addition, the headband generates a pulling force, and exerts the pulling force to the face fitting spring plate 30 and the elastic support 20, so that the face fitting spring plate 30 is deformed. In this way, a shape of the face fitting spring plate 30 matches the face of the user, so that the face fitting spring plate 30 fits the face of the user.

The mask provided in Embodiment 2 of this application generally further includes a light shielding cloth. The light shielding cloth generally covers a side surface of the support 10 and a side surface of the face fitting spring plate 30. The light shielding cloth is used to cover space between the support 10 and the face fitting spring plate 30, to prevent external light from entering the mask after the user wears the mask. It may be understood that the elastic support strip 20 is covered by the light shielding cloth. A light shielding effect may be improved. In addition, the elastic support strip 20 may be hidden under the light shielding cloth. In this way, a design of an outer surface of the mask is simple and elegant, thereby improving beauty of the mask.

In a possible implementation, the mask generally further includes a foam. The foam is a single foam layer. The foam is generally disposed on the face fitting surface that is of the face fitting spring plate 30 and that fits the face of the user, to improve wearing comfortableness of the mask. A shape and a size of the foam are the same as or similar to those of the face fitting spring plate 30. A through hole corresponding to the eyepiece hole 32 is disposed in a middle part of the foam. In this way, the foam does not block light from entering the eyes of the user, thereby ensuring a viewing angle range of the mask. In addition, the foam is usually wrapped in the light shielding cloth. The light shielding cloth can be used to protect the foam from damage and prolong service life of the foam.

Embodiment 3

Figure 13:
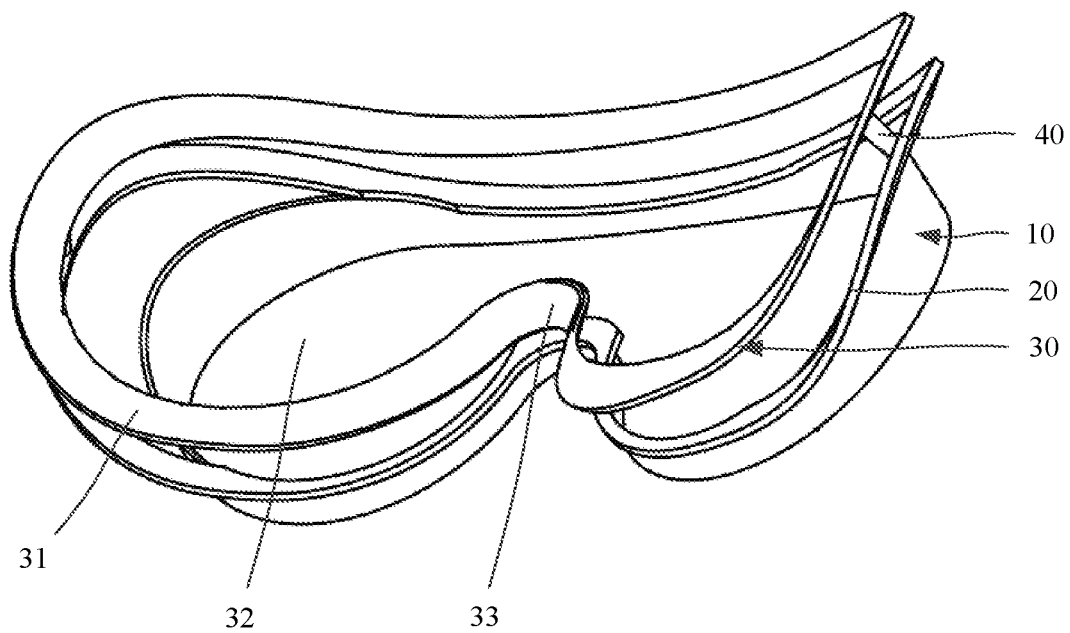
FIG. 13 is a stereoscopic rear view of a mask according to Embodiment 3 of this application.
Figure 14:
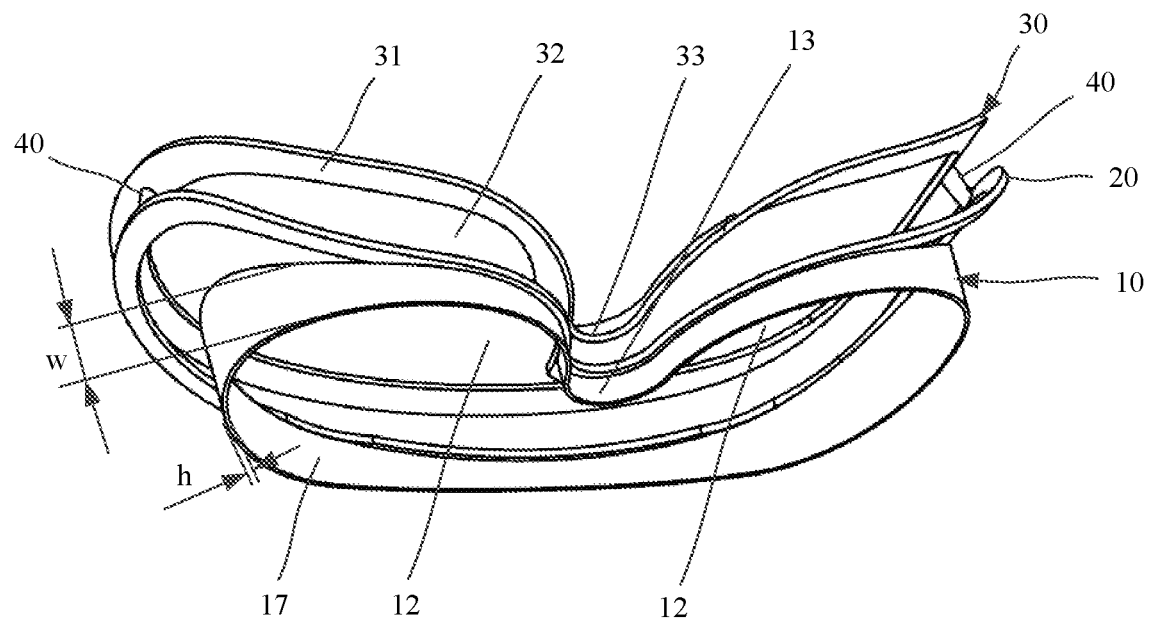
FIG. 14 is a stereoscopic front view of a mask according to Embodiment 3 of this application.

As shown in FIG. 13 and FIG. 14, a mask provided in Embodiment 3 of this application includes a support 10, an elastic support 20, and a face fitting spring plate 30. The support 10 includes a sheet-like frame 17 and lens holes 12 disposed in the sheet-like frame 17. A frame thickness h of the sheet-like frame 17 is far less than a width w of the frame, so that a side wall of the lens hole 12 is tubular. In a length direction of the sheet-like frame 17, the lens holes 12 include a left-eye lens hole and a right-eye lens hole that are connected to each other. The left-eye lens hole and the right-eye lens hole form a B-shaped through hole. In this design, no obstacle exists in regions corresponding to left and right eyes of a user, thereby improving image integrity in the eyes of the user. An arc-shaped notch 13 is disposed between the left-eye lens hole and the right-eye lens hole. The arc-shaped notch 13 corresponds to a nose support of the face fitting spring plate 30.

A middle part of the face fitting spring plate 30 is sunken to the support 10. In a direction from left to right of the lens frame 14, the face fitting spring plate 30 is approximately in an arc shape. A contour shape of the face fitting spring plate 30 is similar to a contour of the face of the user. More specifically, the contour shape of the face fitting spring plate 30 is similar to the contour of the face above the nose of the user. When the user wears the mask, the face fitting spring plate 30 can fit the face of the user. The face fitting spring plate 30 is made of an elastic material, so that the face fitting spring plate can be deformed under an external force. In this way, the face fitting spring plate can fit different face shapes, thereby improving applicability of the mask.

In this embodiment, the face fitting spring plate 30 includes a ring-shaped spring plate 31. The ring-shaped spring plate 31 is a sheet-like elastic plate with an opening inside. The opening inside the ring-shaped spring plate 31 is an eyepiece hole 32. Content displayed by using a display apparatus enters the eyes of the user through the lens holes 12 and the eyepiece hole 32. A shape of the ring-shaped spring plate 31 is similar to a shape of a racetrack. The ring-shaped spring plate 31 includes a left side edge and a right side edge that are disposed opposite to each other, and an upper side edge and a lower side edge that are disposed opposite to each other. The upper side edge and the lower side edge are two long side edges of the ring-shaped spring plate, and the left side edge and the right side edge are two short side edges of the ring-shaped spring plate. The upper side edge and the lower side edge are located between the left side edge and the right side edge, and are separately connected to the left side edge and the right side edge. The left side edge, the right side edge, the upper side edge, and the lower side edge are an integrated structure. The eyepiece hole 12 is enclosed by using the left side edge, the right side edge, the upper side edge, and the lower side edge. The eyepiece hole 12 includes a left eyepiece hole part and a right eyepiece hole part that are connected to each other. The left eyepiece hole part and the right eyepiece hole part are located on two sides of the nose support 33. The left eyepiece hole part and the right eyepiece hole part are connected to each other on sides opposite to each other. The left eyepiece hole part corresponds to the left-eye lens hole 12 in the lens frame 14, and the right eyepiece hole part corresponds to the right-eye lens hole 12 in the lens frame 14. Areas of the left eyepiece hole part and the right eyepiece hole part are generally greater than areas of the lens holes 12, to enlarge a field of view of the eyepiece hole. In this way, the face fitting spring plate does not block light emitted by the display device.

A surface that is of the ring-shaped spring plate 31 and that is away from the support 10 is a face fitting surface. The face fitting surface is a surface fitting the face of the user. A width of each side edge of the ring-shaped spring plate 31 is greater than a thickness of the ring-shaped spring plate. In this way, when the face fitting surface of the ring-shaped spring plate 31 fits the face of the user, a contact area between the ring-shaped spring plate 31 and the face of the user is relatively large. Therefore, when the user wears the mask for a long time, the ring-shaped spring plate 31 is forced into the face of the user, causing a significant indentation or a ligature mark on the face of the user.

The left side edge and the right side edge of the ring-shaped spring plate 31 are respectively connected to left and right sides of a frame board 11 by using the elastic support 20. Both the upper side edge and the lower side edge of the ring-shaped spring plate 31 are in an arc shape. A middle part of the lower side edge of the ring-shaped spring plate 31 is sunken to the support 10 to form the nose support 33. As shown in FIG. 11 and FIG. 12, a part that is of the spring plate and that forms the nose support 33 is twisted by a specified angle relative to the remaining region of the lower side edge, or the spring plate in the nose support 33 is inclined by a specific angle relative to the spring plate in the remaining region of the lower side edge. The angle is greater than 0 degrees and less than 90 degrees. When the user wears the mask, the part that is of the ring-shaped spring plate 31 and that is located in the nose support 33 fits the nose of the user, and the ring-shaped spring plate 31 in the remaining region other than the nose support 33 fits the face of the user. By using this design, a fitting effect between the face fitting spring plate 30 and the face of the user can be improved, and the nose support 33 fits the nose of the user to support the mask, thereby preventing the mask from slipping from the face of the user and improving comfortableness of the mask.

A shape of the elastic support 20 is the same as or similar to a shape of the face fitting spring plate 30. A size of the elastic support 20 is the same as or similar to a size of the face fitting spring plate 30. In other words, the elastic support 20 also includes a ring-shaped spring plate. The ring-shaped spring plate is a sheet-like elastic plate with an opening inside. The opening inside the ring-shaped spring plate corresponds to the eyepiece hole 32 of the face fitting spring plate 30. Content displayed by using the display apparatus enters the eyes of the user through the lens holes 12 and the eyepiece hole 32.

Figure 15:
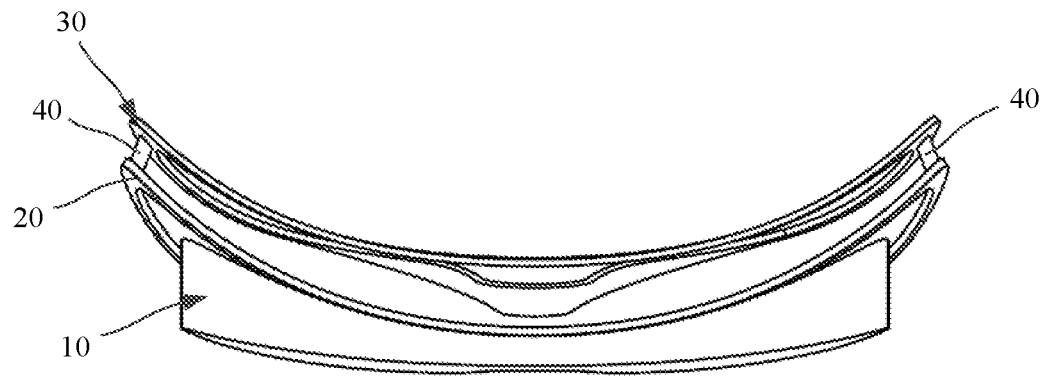
FIG. 15 is a bottom view of FIG. 14.
Figure 16:
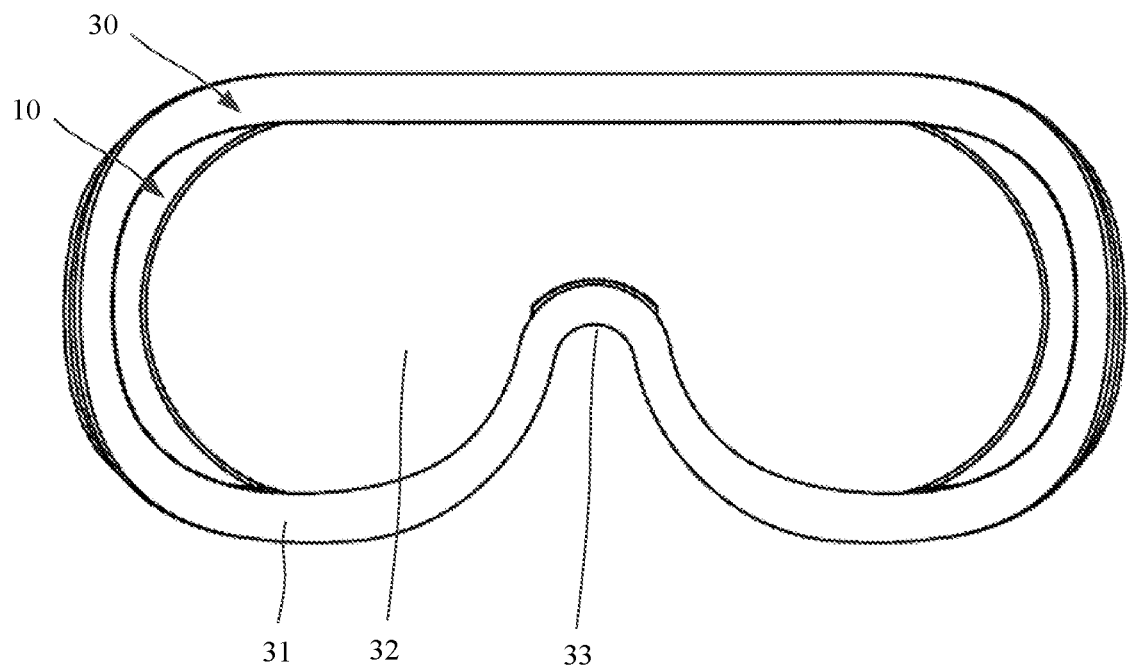
FIG. 16 is a rear view of FIG. 14.

In this embodiment, as shown in FIG. 15 and FIG. 16, the elastic support 20 is located between the support 10 and the face fitting spring plate 30. A middle part of the elastic support 20 is connected to a middle part of the support 10. Left and right sides of the elastic support 20 are respectively connected to left and right sides of the face fitting spring plate 30 by using a connector 40. In this design, in comparison with Embodiment 1 in which the elastic support 20 is a long-strip-shaped elastic strip, the elastic support 20 is an elastic support 20 that is the same as or similar to the face fitting spring plate 30 and that is used to connect the support 10 and the face fitting spring plate 30, thereby greatly improving entire strength of the mask and protect the mask from damage. In addition, when the user wears the mask in Embodiment 3, the elastic support 20 that is the same as or similar to the face fitting spring plate 30 is used to support the face fitting spring plate 30, so that the face fitting spring plate 30 has better stability.

In the mask provided in Embodiment 3 of this application, both the face fitting spring plate 30 and the elastic support 20 can be deformed under an external force. Therefore, when different users wear the mask, the face fitting spring plate 30 and the elastic support 20 are deformed in different degrees, so that the face fitting spring plate 30 can fit faces of different users. In related technologies, a plurality of foam layers are used to be adapted to different face shapes. In comparison with the related technologies, the mask is applicable to different face shapes without using the plurality of foam layers. In this way, a thickness of a face fitting part of the mask is significantly reduced, and air permeability of the mask is improved, thereby further improving wearing comfortableness of the mask. In addition, because the foam use amount is greatly reduced, a volume of the mask may also be significantly reduced, thereby improving convenience in carrying the mask.

In the foregoing mask, materials of the support 10, the elastic support 20, the face fitting spring plate 30, and the connector 40 may be plastic, metal, or alloy. In addition, the support 10, the elastic support 20, the face fitting spring plate 30, and the connector 40 may be an integrated molding structure. For example, the support 10, the elastic support 20, the face fitting spring plate 30, and the connector 40 are an integrated injection molding structure. However, this is not limited thereto. The support 10, the elastic support 20, the face fitting spring plate 30, and the connector 40 may alternatively be independent parts to form the foregoing structure of the mask in a connection manner such as screwing, welding, or bonding. For example, the support 10, the elastic support 20, the face fitting spring plate 30, and the connector 40 are respectively titanium alloy parts, and are connected together in a welding manner.

To facilitate wearing performed by the user, in a possible implementation, the foregoing mask generally further includes a headband. Both ends of the headband may be connected to the left and right sides of the lens frame 14, or may be connected to the left and right sides of the face fitting spring plate 30. When the user wears the mask, the mask may be fastened to the face of the user through adjusting the headband. In addition, the headband generates a pulling force, and exerts the pulling force to the face fitting spring plate 30, so that the face fitting spring plate 30 is deformed. In this way, a shape of the face fitting spring plate 30 matches the face of the user, so that the face fitting spring plate fits the face of the user.

The mask provided in Embodiment 3 of this application generally further includes a light shielding cloth. The light shielding cloth generally covers a side surface of the support 10 and a side surface of the face fitting spring plate 30. The light shielding cloth is used to cover space between the support 10 and the face fitting spring plate 30, to prevent external light from entering the mask after the user wears the mask. It may be understood that the elastic support strip 20 is covered by the light shielding cloth. A light shielding effect may be improved. In addition, the elastic support strip 20 may be hidden under the light shielding cloth. In this way, a design of an outer surface of the mask is simple and elegant, thereby improving beauty of the mask.

In a possible implementation, the mask generally further includes a foam. The foam is a single foam layer. The foam is generally disposed on the face fitting surface that is of the face fitting spring plate 30 and that fits the face of the user, to improve wearing comfortableness of the mask. A shape and a size of the foam are the same as or similar to those of the face fitting spring plate 30. A through hole corresponding to the eyepiece hole 32 is disposed in a middle part of the foam. In this way, the foam does not block light from entering the eyes of the user, thereby ensuring a viewing angle range of the mask. In addition, the foam is usually wrapped in the light shielding cloth. The light shielding cloth can be used to protect the foam from damage and prolong service life of the foam.

An embodiment of this application further provides a head-mounted display device. The head-mounted display device includes the mask described in the foregoing embodiments, and the display apparatus disposed in front of the mask. In front of the mask indicates a surface that is of a support and that is away from a face fitting spring plate. The display apparatus may be an apparatus for displaying information such as a text, an image, or an animation, for example, a mobile phone, a game console, or a tablet computer. When a user wears the head-mounted display device, the face fitting spring plate of the mask fits the face of the user. Because the face fitting spring plate can be deformed when being under an external force. In this way, the face fitting spring plate can be deformed adaptively according to different face shapes, so that the face fitting spring plate can fit faces of different users. In related technologies, a plurality of foam layers need to be used to be adapted to different face shapes. In comparison with the related technologies, a foam use amount of a face fitting part of the mask is greatly reduced, and air permeability of the mask is improved, thereby further improving wearing comfortableness of the mask. In addition, because the foam use amount is greatly reduced, a volume of the mask may also be significantly reduced, thereby improving convenience in carrying the mask.

In the descriptions in this specification, descriptions about reference terms such as "an embodiment", "some embodiments", "an example", "a specific example", and "some examples" mean that specific features, structures, materials, or characteristics described with reference to the embodiments or examples are included in at least one embodiment or example of this application. In the specification, the foregoing example expressions of the terms are not necessarily with respect to a same embodiment or example. In addition, the described specific features, structures, materials, or characteristics may be combined in a proper manner in any one or more of the embodiments or examples.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A head-mounted display device comprising a mask, the mask comprising a first support, an elastic support, and a face fitting spring plate, wherein lens holes are disposed in the first support, the face fitting spring plate is connected to the first support by using the elastic support, a middle part of the face fitting spring plate is sunken to the first support, an eyepiece hole facing the lens holes is disposed in the face fitting spring plate, and a nose support is disposed in a middle part on a lower side edge of the face fitting spring plate, wherein the elastic support comprises a first elastic strip and a second elastic strip, the first support has a left end and an opposite right end, and the face fitting spring plate has a left end and an opposite right end, wherein one end of the first elastic strip is connected to the left end of the first support and an opposite end of the first elastic strip is connected to the left end of the face fitting spring plate, wherein one end of the second elastic strip is connected to the right end of the first support and an opposite end of the second elastic strip is connected to the right end of the face fitting spring plate, wherein the first elastic strip and the second elastic strip are curved elongated strips, wherein the curvature of each of the first elastic strip and the second elastic strip extends along the length of the respective elongated strip, wherein the first elastic strip spaces apart the left end of the first support and the left end of the face fitting spring plate, and wherein the second elastic strip spaces apart the right end of the first support and the right end of the face fitting spring plate.

2. The head-mounted display device according to claim 1, wherein the face fitting spring plate is a ring-shaped spring plate, and a hole enclosed by the ring-shaped spring plate is the eyepiece hole.

3. The head-mounted display device according to claim 2, wherein the eyepiece hole is a rectangular hole.

4. The head-mounted display device according to claim 2, wherein a middle depression on the lower side edge of the ring-shaped spring plate forms the nose support, and a part that is of the ring-shaped spring plate and that forms the nose support is twisted by a specified angle relative to the remaining part of the ring-shaped spring plate.

5. The head-mounted display device according to claim 4, wherein the eyepiece hole comprises a left eyepiece hole part and a right eyepiece hole part that are located on two sides of the nose support, and the left eyepiece hole part and the right eyepiece hole part are connected to each other on sides opposite to each other.

6. The head-mounted display device according to claim 1, wherein the first support comprises a frame plate, a left-eye lens hole and a right-eye lens hole are disposed in a frame board, and the left-eye lens hole and the right-eye lens hole form the lens holes.

7. The head-mounted display device according to claim 6, wherein an arc-shaped notch is disposed in a middle part on a lower side edge of the frame board, and the arc-shaped notch is opposite to the nose support.

8. The head-mounted display device according to claim 1, wherein the first support comprises a lens frame, a nose support is disposed in a middle part of a lower side edge of the lens frame, a left-eye lens hole and a right-eye lens hole on two sides of the nose support are disposed in the lens frame, and the left-eye lens hole and the right-eye lens hole form the lens holes.

9. The head-mounted display device according to claim 5, wherein at least one lightening hole is disposed in a region located between the left-eye lens hole and the right-eye lens hole of the first support.

10. The head-mounted display device according to claim 1, wherein the first support comprises a sheet-like bezel, and holes enclosed by the sheet-like bezel are the lens holes.

11. The head-mounted display device according to claim 10, wherein an arc-shaped depression part is disposed in a middle part on a lower side edge of the sheet-like bezel, and the arc-shaped depression part is sunken to an upper side edge of the sheet-like bezel.

12. The head-mounted display device according to claim 1, wherein left and right sides of the face fitting spring plate are respectively connected to left and right sides of the first support by using the elastic strips.

13. The head-mounted display device according to claim 1, wherein the middle part of the face fitting spring plate is connected to a middle part of the first support by using the first elastic strip and the second elastic strip.

14. The head-mounted display device according to claim 1, wherein the elastic support is a U-shaped elastic strip or a V-shaped elastic strip, and left and right sides of the face fitting spring plate are respectively connected to left and right sides of the first support by using the U-shaped elastic strips or the V-shaped elastic strips.

15. The head-mounted display device according to claim 1, wherein the elastic support is an elastic plate that is the same as the face fitting spring plate, a middle part of the elastic support is connected to a middle part of the first support, and left and right sides of the elastic support are connected to left and right sides of the face fitting spring plate.

16. The head-mounted display device according to claim 1, wherein the mask further comprises a light-shielding cloth, and the light-shielding cloth covers space between the face fitting spring plate and the first support.

* * * * *